United States Patent Office 2,849,409
Patented Aug. 26, 1958

2,849,409

LIQUID COATING COMPOSITION COMPRISING A METHYL METHACRYLATE POLYMER AND CELLULOSE ACETATE BUTYRATE

John L. Evans, Springfield, Pa., assignor to E. I. du Pont de Nemours and Company, Wilmington, Del., a corporation of Delaware No Drawing. Application February 7, 1956
Serial No. 563,849

5 Claims. (Cl. 260—17)

This invention relates to liquid coating compositions. More particularly, it relates to liquid coating compositions or lacquers which contain as an essential film-forming constituent a combination of cellulose acetate butyrate and a polymer of methyl methacrylate of specified characteristics hereinafter described.

Dry films or coatings obtained from the application of liquid coating compositions employing a polymer of methyl methacrylate as the principal film-forming constituent are known generally to have outstanding durability and gloss retention but unfortunately they are susceptible to cracking and crazing and this limits their utility.

"Cracking," by which is meant visible relatively long fissures in a dry coating which may go down thru the full thickness of a dry coating to another coating beneath or to a substrate, frequently develops during outdoor exposure of dry coatings obtained from polymethyl methacrylate lacquers.

"Crazing," a term used to refer to minute shallow interconnecting fissures at the surface of a coating, frequently develops when the dry polymethyl methacrylate coating is exposed to solvent, such as when it is patched or refinished with the same or a different coating composition at normal painting temperatures of about 50°–90° F.

I have now discovered liquid coating compositions or lacquers that make possible substantial retention of the desirable durability and gloss characteristics of dry coatings obtained from liquid coating compositions containing a polymer of methyl methacrylate as the film-forming constituent and at the same time elimination or substantial inhibition of the cracking and crazing tendencies of such coatings.

The liquid coating compositions of my invention comprise as a film-forming constituent a polymer of methyl methacrylate having a relative viscosity of about 1.117 to 1.196 and about 15% to 75% of cellulose acetate butyrate having a viscosity of about 0.1 to 2.0 seconds, the percentage being by weight based on the total weight of said polymer of methyl methacrylate and said cellulose acetate butyrate.

The polymers of methyl methacrylate suitable for use in the compositions of this invention are those having a relative viscosity of about 1.117 to 1.196 as indicated above and, more preferably, of about 1.148 to 1.183. These relative viscosity ranges correspond to molecular weight ranges, calculated as shown hereinafter, of about 55,000 to 105,000 and 75,000 to 95,000 respectively.

The term "relative viscosity," as used herein, is the value obtained by dividing the efflux time of a solution, A, of the polymer of methyl methacrylate by the efflux time of the solvent, B, used in said solution, the efflux times being measured in accordance with the procedure of ASTM–D–445–46T, Method B, using as polymer solution A, a solution of 0.25 gram of the polymer of methyl methacrylate being tested in 50 cc. of ethylene dichloride and as the solvent B, ethylene dichloride. The efflux times are determined at 25° C. in a standard apparatus currently marketed under the designation of a modified Ostwald viscosimeter, series 50.

The molecular weight figures referred to herein are weight average molecular weights and are calculated from the equation $$M = 1.47 \times 10^6 \ (N_r - 1 - \ln N_r)^{0.65}$$

where M is the molecular weight and $N_r$ is the relative viscosity.

The polymers of methyl methacrylate useful in making the compositions of the invention are either homopolymers of methyl methacrylate or copolymers with minor amounts, for example, in the order of 2 to 25% by weight, of another material copolymerizable therewith, for instance, acrylic acid, methacrylic acid, the 1 to 4 carbon alkyl (i. e., methyl to butyl) esters of acrylic acid, the 2 to 4 carbon alkyl (i. e., ethyl, propyl, and butyl) esters of methacrylic acid, vinyl acetate, acrylonitrile, and styrene. A preferred copolymer contains about 98% of methyl methacrylate and 2% methacrylic acid. Thus the term "polymer of methyl methacrylate" and related terms, as used herein, refer to such homopolymers and copolymers as well as mixtures of homopolymers, mixtures of copolymers, and mixtures containing both homopolymer and copolymer.

Polymers of methyl methacrylate for use in this invention can be prepared according to well known methods by polymerizing methyl methacrylate monomer, with or without another monomer copolymerizable therewith, either in bulk, in solution, or in granular form to produce products having the required relative viscosity.

The cellulose acetate butyrates used in combination with the polymers of methyl methacrylate in accordance with this invention are those having viscosities of about 0.1 to 2.0 seconds as determined by ASTM method D–871–48, formula B. Such grades of cellulose acetate butyrate can be prepared according to known methods.

The proportions or weight ratios of cellulose acetate butyrates to polymer of methyl methacrylate used in formulating the liquid coating compositions of this invention can be varied widely, specifically within the range of about 15:85 to 75:25. At ratios below that range, the desired crack and craze resistance is not obtained and above that range, commercially unacceptable loss of gloss occurs. In general, the preferred weight ratio of cellulose acetate butyrate to polymer of methyl methacrylate is from 25:75 to 50:50 although it will generally be found desirable for viscosity reasons to use somewhat smaller amounts of those grades of cellulose acetate butyrate having a viscosity above about one second.

The coating compositions or lacquers, which terms are used herein synonymously to refer to liquid coating compositions suitable for application to a substrate, can contain conventional modifying agents in addition to the essential constituents of cellulose acetate, butyrate, polymer of methyl methacrylate, and solvent. Thus they can, and will unless a clear coating is desired, contain pigments, and they can also contain other conventional modifiers for coating compositions such as plasticizers, inhibitors, dispersing agents, flow control agents, and the like.

Examples of the volatile solvents and diluents which can be used in formulating the coating compositions of this invention are toluene, xylene, butyl acetate, acetone, methyl isobutyl ketone, butyl alcohol, and other aliphatic cycloaliphatic and aromatic hydrocarbons, esters, ethers, ketones, and alcohols such as are conventionally used in coating compositions.

Examples of the great variety of pigments which can be used in making the coating compositions of the invention are the iron blues, organic reds and maroons, silica, talc, china clay, and metallic oxides, silicates, chromates, sulfides and sulfates. The pigments are, of course, used in proportions normally used in lacquers.

Any of the many known plasticizers for polymers of methyl methacrylate can be employed in compositions of the invention. The preferred plasticizer from the standpoint of the best overall balance of properties is benzyl butyl phthalate. Other plasticizers which aid in providing dry films having especially desirable properties are dibutyl phthalate, triphenyl phosphate, 2-ethyl hexyl benzyl phthalate, and dicyclohexyl phthalate. Other known plasticizers for polymers of methyl methacrylate which can be used include diallyl phthalate, dibenzyl phthalate, butyl cyclohexyl phthalate, mixed benzoic acid and fatty oil acid esters of pentaerythritol, poly (propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di 2-ethyl hexyl ester of hexamethylene diphthalate, di(methylcyclohexyl) phthalate. In general, the plasticizers are used in amounts of about 10 to 50% by weight based on the weight of the polymer of methyl methacrylate.

Other conventional modifying agents for coating compositions can, if desired, be incorporated to alter the manufacturing, storage, application or service properties of the compositions of the invention. Illustrative of such modifying agents are soya lecithin, silicone fluids, triethanolamine, fatty oil acids and glyceride oil derivatives.

While cellulose acetate butyrate and a polymer of methyl methacrylate are, as pointed out heretofore, the essential film-forming constituents of the compositions of this invention, it will be understood that minor proportions of other well known film-forming constituents which are compatible therewith can be incorporated in the compositions of the invention to effect some variation such as the degree of hardness or flexibility in the dried film. Examples of such film-forming materials are polymers and copolymers of vinyl esters, polymers and copolymers of acrylic esters other than the essential polymer of methyl methacrylate, oil-modified alkyd resins and natural resins.

The various ingredients can be brought together to form the compositions of this invention according to conventional methods for preparing organic coating compositions. Pigmented coating compositions of the invention can, for example, be prepared by dispersing the pigment in the polymer of methyl methacrylate, the cellulose acetate butyrate, or a mixture of both by means of conventional paint grinding equipment. The solvents, diluents, plasticizers, and other modifiers used can be incorporated before, during, or after the milling operation.

The liquid coating compositions of the invention can be applied to a variety of substrates, for example, wood, glass, and metal, by any of the usual application methods such as spraying, dipping, and brushing. The liquids so applied can be air dried or alternatively the drying period can be minimized by baking. The resulting coatings or films can be rubbed or polished in accordance with conventional techniques, if desired, to improve smoothness or apparent gloss or both. It will be understood that the terms "coating" and "film" are used above and elsewhere in this document, unless otherwise modified, to designate dry coatings obtained by applying liquid coating compositions to a substrate and permitting or causing said compositions to dry.

The liquid coating compositions of this invention are especially useful for coating articles which are subjected to the weather, which are required to protect the substrate and to retain a pleasing and decorative appearance for long periods and which are sometimes required to be wholly or partly refinished. For these reasons, the compositions are particularly useful at topcoat finishes for application to suitably primed automobile bodies.

In order that the invention may be better understood, the following examples illustrating compositions of the invention, their preparation, application, and use are given in addition to the examples already given above.

EXAMPLES 1–3

This series of examples points up the crack resistant characteristic of films obtained using the liquid coating compositions of the invention.

Three coating compositions having different proportions of cellulose acetate butyrate to polymer of methyl methacrylate were prepared by blending compositions A and B below. Parts and percentages are by weight unless otherwise indicated.

Composition A

| Cellulose acetate butyrate composition: | Parts |
|---|---|
| Cellulose acetate butyrate | 23.0 |
| Toluene | 14.3 |
| Xylene | 21.0 |
| Methyl isobutyl ketone | 21.5 |
| Butyl alcohol | 6.2 |
| Butyl acetate | 9.6 |
| Titanium dioxide pigment | 4.4 |
| | 100.0 |

The cellulose acetate butyrate used in preparing composition A had a viscosity rating of about 0.5 second as determined by ASTM method D–871–48 Formula B, an acetyl content of 12–15%, a butyryl content of 35–39% and a hydroxyl content of 0.5–1.2%.

Composition B

| Methyl methacrylate composition: | Parts |
|---|---|
| Solution of polymer of methyl methacrylate | 80.7 |
| Dibutyl phthalate | 13.1 |
| Titanium dioxide pigment | 6.2 |
| | 100.0 |

The solution of the polymer of methyl methacrylate used in preparing composition B consisted of the following components:

| | Parts |
|---|---|
| Polymer of methyl methacrylate (relative viscosity 1.158; molecular weight approx. 81,500) | 40.7 |
| Toluene | 41.5 |
| Acetone | 17.8 |
| | 100.0 |

A portion of composition B was retained without change for use as a control lacquer, that is, as a lacquer containing no cellulose acetate butyrate, to provide a basis for comparison with compositions of the invention.

Compositions A and B were prepared by grinding the tabulated ingredients in conventional paint grinding equipment until smooth dispersions were produced. The dispersions so obtained were then blended in the proportions indicated in Table 1 below. The resulting lacquers and the control (composition B) were thinned to spraying viscosity and each was sprayed on a separate area of steel previously coated with an identical prime coat. The compositions of the invention were applied in amount sufficient to provide a topcoat layer about 3 mils thick. The coated steel was then baked for 45 minutes at about 200° F. to speed the drying, which at room temperature would have required about 16 to 24 hours. The resulting coatings were smooth, uniform, hard and glossy.

The cracking characteristics of the coated steel were then evaluated under conditions known to accentuate cracking in order that differences would be more readily observed. The coated steel was exposed outdoors in Florida for one year. Also the dibutyl phthalate plasticizer used in the lacquers of these examples was known from other evaluatitons to provide somewhat less crack resistant lacquers of the invention than benzyl butyl phthalate.

Table 1 shows the composition of each of Examples 1, 2 and 3 and observations made on cracking at the end of the one year exposure.

TABLE 1

|  | Example 1 | Example 2 | Example 3 | Control |
|---|---|---|---|---|
| Percent composition A | 32.2 | 58.8 | 81.1 | 0 |
| Percent composition B | 67.8 | 41.2 | 18.9 | 100 |
| Ratio cellulose acetate butyrate:polymer of methyl methacrylate | 25:75 | 50:50 | 75:25 | 0:100 |
| Cracking developed | Slight | None | None | Severe |

Additional critical evaluations in which the weight ratio of cellulose acetate butyrate to polymer of methyl methacrylate were extended outside the range of 25:75 to 75:25 illustrated by Examples 1 thru 3 show that below a weight ratio of about 15:85, there was no substantial improvement in crack resistance over lacquers containing no cellulose acetate butyrate and that above about 75:25, there was an unacceptable loss of gloss.

EXAMPLES 4–6

This series of examples points up the craze resistant characteristic of films obtained from lacquers of the invention.

Liquid coating compositions of the invention having the formulas shown in Table 2 were prepared by grinding the pigment with part of the solution of polymer of methyl methacrylate and subsequently adding the remaining constituments.

TABLE 2

|  | Parts ||||
|---|---|---|---|---|
|  | Example 4 | Example 5 | Example 6 | Control |
| Solution of polymer of methyl methacrylate | 108.3 | 95.8 | 63.9 | 127.7 |
| Cellulose acetate butyrate solution | 39.0 | 64.5 | 129.5 | 0.0 |
| Benzyl butyl phthalate | 23.3 | 23.3 | 23.3 | 23.3 |
| Titanium dioxide pigment | 25.0 | 25.0 | 25.0 | 25.0 |
| Solvent | 123.3 | 123.5 | 123.6 | 57.3 |

The solution of polymer of methyl methacrylate used in making the compositions shown in Table 2 contained 40.5% by weight of a homopolymer of methyl methacrylate having a relative viscosity of 1.165 (molecular weight approximately 84,500) dissolved in a mixture of toluene and acetone.

The cellulose acetate butyrate solution used in making the compositions given in Table 2 contained 20% by weight of half-second cellulose acetate butyrate dissolved in a mixture of methyl ethyl ketone, methyl isobutyl ketone and toluene.

The solvent referred to in Table 2 was a mixture of methyl ethyl ketone, toluene and xylene.

In the compositions of Examples 4, 5 and 6, the weight ratio of cellulose acetate butyrate to polymethyl methacrylate was 15:85, 25:75 and 50:50, respectively.

The lacquers of Examples 4, 5 and 6 and the control lacquer were thinned to spraying viscosity and were sprayed on primed steel panels in an amount sufficient to provide a topcoat layer about 2 mils thick. The panels were baked for 30 minutes at about 200° F., cooled to room temperature, buffed with a lamb wool-covered mechanical buffer and were submitted to an accelerated aging treatment by heating at 200° F. for 4 hours. The resulting coatings were smooth, uniform, hard and glossy.

The coatings of this series of examples were then subjected to a test to determine their maximum crazing temperature. It is known that the tendency of a film obtained from a methyl methacrylate lacquer to craze as result of contact with a solvent decreases with increasing temperature. Maximum crazing temperature is the temperature above which a film does not craze upon contact with a given solvent. Thus, determination of maximum crazing temperature is useful in comparing the crazing tendencies of methyl methacrylate lacquers since it indicates the minimum temperature at which a film can be contacted with solvents, as in refinishing, without crazing.

The maximum crazing temperatures for each of the lacquers of Examples 4, 5 and 6 and for the control was determined as follows:

The lid-engaging rim of a one gallon cylindrical can was cut out so that the can could be filled brim-full of water to produce a convex meniscus on the surface. The coated panel to be tested was placed, coated side up, on the meniscus in such a manner that the top edge of the can supported the panel and the back of the panel but not the coated side was directly in contact with the water. With respect to each test, the water was maintained at a predetermined temperature and served merely to bring the test panel to the predetermined temperature. After the coated panel had attained the temperature of the water, a drop of methyl ethyl ketone was placed on the film surface and was permitted to evaporate. Then a second drop of methyl ethyl ketone was placed on the same spot and permitted to evaporate. The spot was then examined for the minute surface cracks which constitute crazing. In Examples 4, 6 and the control, tests were made at temperatures between 50° and 90° F. in 5° increments. In the case of Example 5, the film was tested at 60° F. only.

The maximum crazing temperatures of the four lacquers, as determined by the above tests, were found to be:

Example 4 _____ below 50° F.
Example 5 _____ below 60° F.
Example 6 _____ below 50° F.
Control _____ 80°–85° F.

The practical significance of the foregoing results is that articles coated with the lacquers of this invention can be refinished with the same or similar lacquers containing craze-inducing solvents at normal painting temperatures without causing crazing whereas the refinishing of unmodified methyl methacrylate lacquers must be undertaken at above normal temperatures to avoid crazing.

A lacquer similar to those of Examples 4, 5 and 6 but having a cellulose acetate butyrate to methyl methacrylate polymer ratio of 75:25 was found to give a film having a maximum crazing temperature below 50° F.

In carrying out the lacquer spraying operations described in the foregoing examples, it was observed that the lacquers containing cellulose acetate butyrate had better spraying properties than the controls because wet coatings of them on vertical surfaces had less tendency to sag or produce "curtains" of wet lacquer flowing down over the area sprayed.

The foregoing detailed description has been given for clearness of understanding only and no unnecessary limitations are to be understood therefrom. The invention is not limited to the exact details shown and described for obvious modifications will appear to those skilled in the art and any departure from the description herein which conforms to the principles of the invention is intended to be included in the scope of the claims below.

I claim:

1. A liquid coating composition comprising as an essential film-forming constituent a polymer of methyl methacrylate having a relative viscosity of about 1.117 to 1.195, cellulose acetate butyrate having a viscosity of about 0.1 to 2.0 seconds, and a solvent for said polymer and cellulose acetate butyrate, the weight ratio of cellulose acetate butyrate to polymer of methyl methacrylate being between 15:85 and 75:25, and said polymer of methyl methacrylate being a member of the group consisting of homopolymers of methyl methacrylate and copolymers of methyl methacrylate with from 2 to 25% by weight of a member of the group consisting of acrylic acid, methacrylic acid, a 1 to 4 carbon alkyl ester of acrylic acid, a 2 to 4 carbon alkyl ester of methacrylic acid, vinyl acetate, acrylonitrile, and styrene.

2. A product of claim 1 in which the polymer of methyl methacrylate has a relative viscosity of 1.148 to 1.183 and in which the ratio of cellulose acetate butyrate to polymer of methyl methacrylate is between 25:75 and 50:50.

3. A product of claim 1 in which the polymer of methyl methacrylate is a homopolymer.

4. A product of claim 1 in which the polymer of methyl methacrylate is a copolymer of methyl methacrylate and from 2 to 25% by weight of a member of the group consisting of acrylic acid, methacrylic acid, a 1 to 4 carbon alkyl ester of acrylic acid, a 2 to 4 carbon alkyl ester of methacrylic acid, vinyl acetate, acrylonitrile and styrene.

5. An article having a dry topcoat layer of a product of claim 1.

References Cited in the file of this patent

UNITED STATES PATENTS

| | | |
|---|---|---|
| 2,628,923 | Yaeger | Feb. 17, 1953 |
| 2,702,255 | Yaeger | Feb. 15, 1955 |